United States Patent [19]

Park

[11] Patent Number: 4,649,429
[45] Date of Patent: Mar. 10, 1987

[54] CIRCUIT FOR DISPLAYING SELECTION OF A CHANNEL IN A TELEVISION SET

[75] Inventor: Chan W. Park, Seoul, Rep. of Korea

[73] Assignee: Gold Star Co., Ltd., Seoul, Rep. of Korea

[21] Appl. No.: 680,903

[22] Filed: Dec. 12, 1984

[30] Foreign Application Priority Data

Dec. 13, 1983 [KR] Rep. of Korea ............. 10593-83[U]

[51] Int. Cl.$^4$ ............................................. H04N 5/50
[52] U.S. Cl. ................................. 358/192.1; 455/159
[58] Field of Search ............ 358/192.1, 193.1, 191.1, 358/10, 188; 455/159

[56] References Cited

U.S. PATENT DOCUMENTS

| | | | |
|---|---|---|---|
| 3,598,906 | 8/1971 | Uetake et al. | 358/192.1 |
| 4,160,278 | 7/1979 | Nelson | 358/192.1 |
| 4,214,273 | 7/1980 | Brown | 358/192.1 X |
| 4,366,502 | 12/1982 | Shiu | 358/192.1 |
| 4,387,401 | 6/1983 | Henderson et al. | 358/193.1 |

FOREIGN PATENT DOCUMENTS 0013219 1/1979 Japan ............................. 358/192.1

Primary Examiner—Howard W. Britton
Assistant Examiner—Victor R. Kostak
Attorney, Agent, or Firm—Birch, Stewart, Kolasch & Birch

[57] ABSTRACT

There is provided a circuit for displaying selection of a channel in television sets. In the circuit, the output voltage from a saw tooth generator generating a saw tooth wave by a horizontal pulse signal is compared with reference voltages applied to the respective connection points of the registers at the operational amplifiers and, thereby, a color bar is generated on a television screen when low level signals are output from both the operational amplifiers. The circuit is constructed in such a manner that changes in the width of the color bar on both sides correspond to the change of reference voltages at the connection points which fluctuate according to the output voltages of an automatic fine tuning circuit (AFT).

1 Claim, 3 Drawing Figures

Fig. 3
(a)
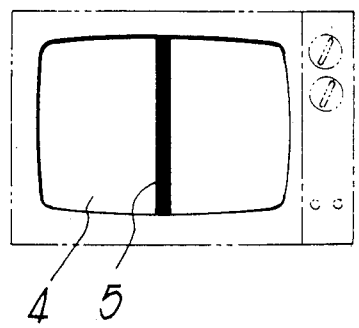
4  5
(b)
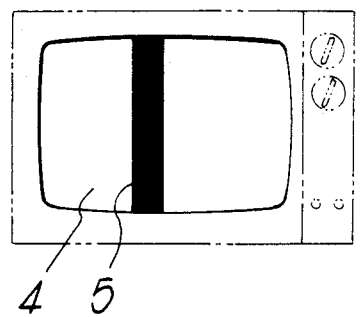
4  5
(c)
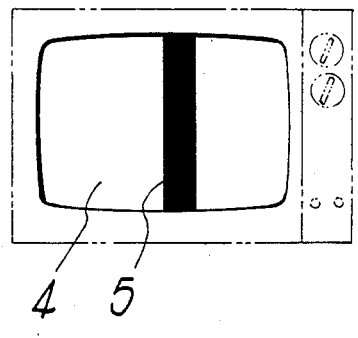
4  5

CIRCUIT FOR DISPLAYING SELECTION OF A CHANNEL IN A TELEVISION SET

BACKGROUND OF THE INVENTION

1. Field of the Invention

This invention relates to a circuit for displaying selection of a channel in a television set, and in particular to a bar type fine tuning system displaying the direction of detuning from the accurate selection point by the direction of change in width of a color bar while displaying tuning of a channel to be selected by the width of the color bar in a television set.

2. Brief Description of a Prior Art

In a conventional circuit for displaying selection of a channel, tuning and detuning of the channel has been displayed by changes in position of a vertical bar, thus causing confusion in judging whether or not the set is tuned or not and further the important factor of increasing the manufacturing cost due to the very complicated construction.

SUMMARY OF THE INVENTION

In view of the above, the present invention provides a tuning indicating system simply constructed, in which a color bar of a fixed width is displayed when a channel to be selected is fine-tuned and the direction of detuning is readily appreciated by changes in width of the color bar in either the lefthand or righthand directions when a channel is detuned utilizing operational amplifiers.

BRIEF DESCRIPTION OF THE DRAWINGS

The construction and the operation of the invention will now be described in detail with reference to the accompanying drawings, in which:

FIG. 3 illustrates the state of a color bar of the invention.

DETAILED DESCRIPTION OF THE PREFERRED EMBODIMENT

Figure 1:
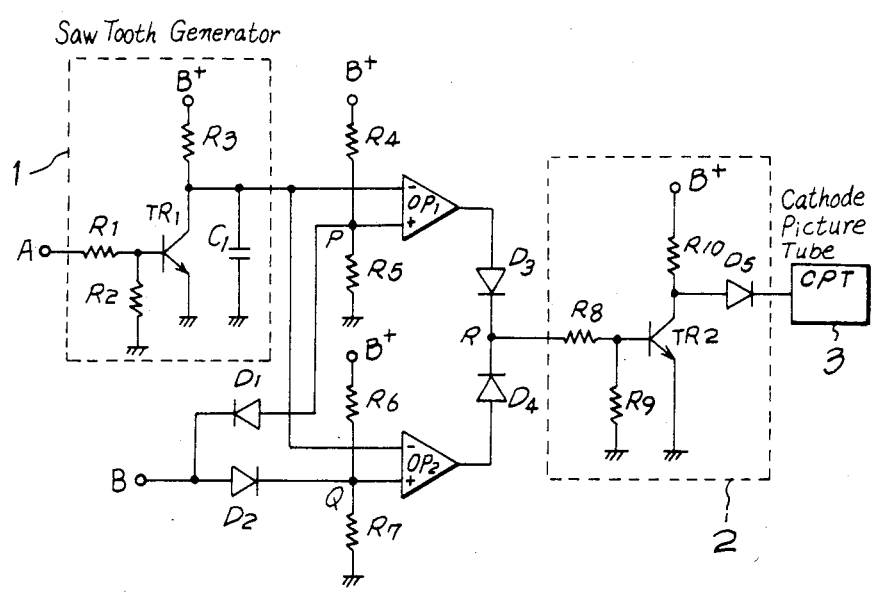
FIG. 1 is a circuit diagram of the present invention.

Referring now to FIG. 1, a horizontal pulse input terminal A is connected through a resistor $R_1$ to a resistor $R_2$ and to the base of a transistor $TR_1$, and the collector of the transistor $TR_1$ is connected to a capacitor $C_1$ and a resistor $R_3$ which is connected to a source terminal $B+$ to form a saw tooth generator 1. The output of the saw tooth generator 1 is connected to the negative input terminal of an operational amplifier $OP_1$ and to the positive input of another operational amplifier $OP_2$. To the positive input terminal of the operational amplifier $OP_1$ is connected a connection point P of a resistor $R_4$ connected to the source terminal $B+$ and a resistor $R_5$ of which the values are determined such that a voltage slightly lower than the output voltage of the automatic fine tuning circuit when the circuit is fine tuned is applied to the connection point P. Also to the negative input terminal of the operational amplifier $OP_2$ is connected a connection point Q of a resistor $R_6$ connected to the source terminal $B+$ and a resistor $R_7$ of which the values are determined such that a voltage slightly higher than the output voltage of the automatic fine tuning circuit when the circuit is fine-tuned is applied the connection point P of the resistors $R_4$ and $R_5$ is connected to the output terminal B of the automatic fine tuning circuit through a diode $D_1$ and the terminal B is connected through a diode $D_2$ to the connection point Q of the resistors $R_6$ and $R_7$. The outputs of the operational amplifiers $OP_1$ and $OP_2$ are connected through diodes $D_3$ and $D_4$ to a driving circuit 2 for a cathode picture tube CPT 3 which compries resistors $R_8$–$R_{10}$, a diode $D_5$ and a transistor $TR_2$.

Figure 2:
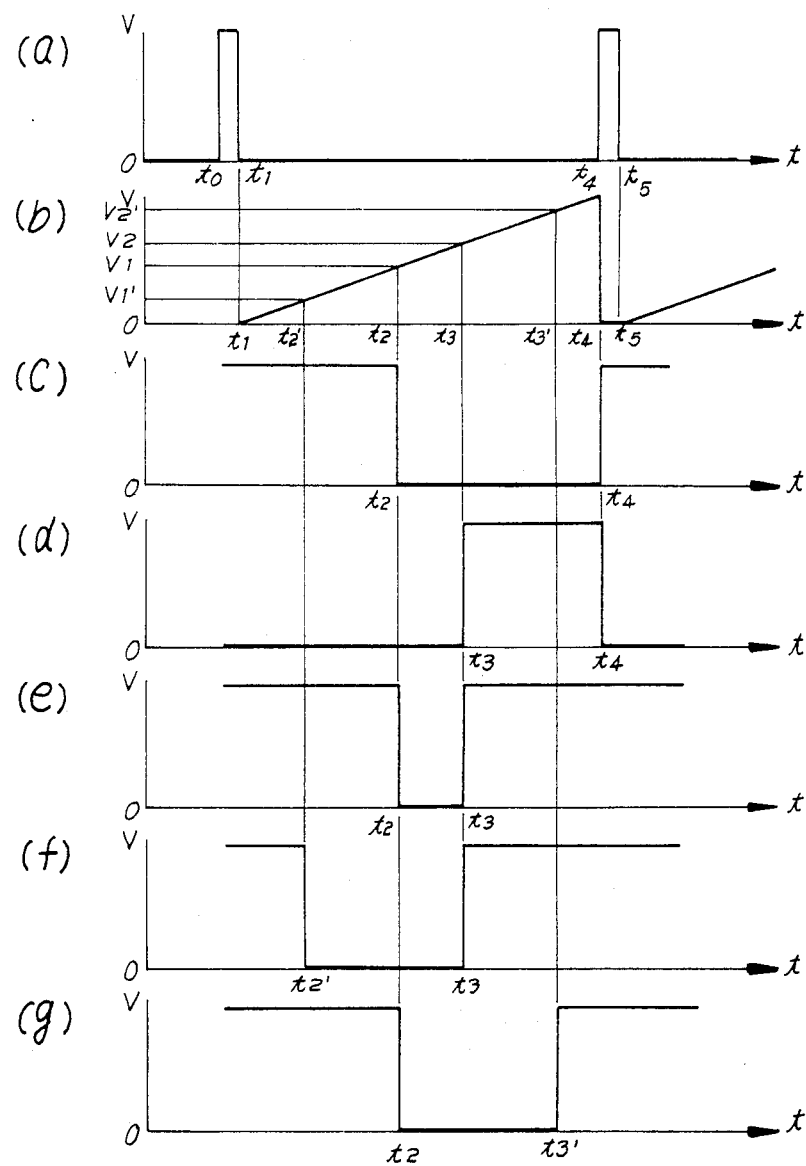
FIG. 2 shows a waveform of each element of the invention.

Referring now to FIG. 2, (a) represents a waveform of a horizontal pulse applied to the horizontal pulse terminal A, (b) shows a waveform of a charging voltage of a capacitor $C_1$, (c) shows a waveform of a output from an operational amplifier OP, when the output voltage from an automatic fine tuning circuit AFT is fine-tuned, (d) shows a waveform of output from another operational amplifier $OP_2$ when the output voltage from the automatic fine tuning circuit is fine-tuned, (e) shows a waveform at the connection point R when the output voltage from the automatic fine tuning circuit is fine-tuned, (f) shows a waveform at the connection point R when the output voltage of the automatic fine tuning circuit is lower than that of fine tuning, and (g) shows a waveform at the connection point R when the output voltage of the automatic fine tuning circuit is higher than that of fine tuning.

In FIG. 3, (a) represents the state of the color bar when the output voltage of the automatic fine tuning circuit is fine tuned, (b) represents the state of the color bar when the output voltage of the automatic fine tuning circuit is lower than that of fine tuning and (c) represents the state of the color bar when the output voltage of the automatic fine tuning circuit is higher than that of fine tuning.

The operation of the invention thus constructed is as follows.

When the voltage source $B+$ is turned on and a horizontal pulse of high level, as shown FIG. 2 (a), is applied to the horizontal pulse input terminal A, this horizontal pulse flows through the resistor $R_1$ to the base of the transistor $TR_1$. Thus the transistor $TR_1$ is conducting while the horizontal pulse is applied to the base of the transistor $TR_1$ (during the period $t_0$–$t_1$ and $t_4$–$t_5$) so that the charged voltage to the capacitor $C_1$ is discharged through the transistor $TR_1$. However, since the transistor $TR_1$ is not conducting while the high level horizontal pulse is not applied to the base of the transistor $TR_1$ ($t_1$–$t_4$), the source voltage $B+$ charges the capacitor $C_1$ through the resistor $R_3$, as shown in FIG. 2 (b). This charged voltage to the capacitor $C_1$ flows to the negative input terminal of the operational amplifier $OP_1$ and to the positive input terminal of the operational amplifier $OP_2$ to be compared with the voltages $V_1$ and $V_2$ applied to the connection points P and Q, respectively. At this time, if the charged voltage to the capacitor $C_1$ is lower than the voltage at the connection point P (before time $t_2$ in FIG. 2), the voltage applied to the negative input terminal of the operational amplifier $OP_1$ is lower than that applied to the positive input terminal thereof so that a high voltage signal is output from the operational amplifier $OP_1$. Further, since the voltage $V_2$ at the connection point Q is set higher than that at the connection point P, the voltage applied to the negative input terminal of the operational amplifier $OP_2$ is higher than that applied to the positive input terminal thereof so that a low voltage signal is output from the operational amplifier $OP_2$. Therefore, the high voltage signal output from the operational amplifier $OP_1$ is applied through the diode $D_3$ and the transistor $R_8$ to the base of the transistor $TR_2$ and the transistor TR$_2$ is conducting. Accordingly, the voltage of the collector of the transistor TR$_2$ becomes low and the voltage supply to CPT 3 is cut off. In the meantime, if the voltage charged to the capacitor C$_3$ becomes higher than the voltage at the connection point P (the period t$_2$–t$_3$ in FIG. 2), the voltage applied to the negative input terminal of the operational amplifier OP$_1$ is higher than that applied to the positive input terminal thereof so that a low level signal is output from the operational amplifier OP$_1$. At this time, since the charged voltage to the capacitor C$_1$ is lower than the voltage V$_2$ at the connection point Q, a low level signal is output from the operational amplifier OP$_1$. Thus, the bias voltage to the base of the transistor TR$_2$ is cut off and the transistor TR$_2$ is turned off so that as the source voltage B+ is applied through resistor R$_{10}$ and the diode D$_5$ to CPT 3, CTP 3 is driven to generate a color bar as shown in FIG. 3.

If the voltage charged to the capacitor C$_1$ becomes higher than that at the connection point Q (after time t$_3$ in FIG. 2), the voltage applied to the positive input terminal of the operational amplifier OP$_2$ is higher than that applied to the negative input thereof so that a high level signal is output from the operational amplifier OP$_2$ and this high level signal makes the transistor TR$_2$ conduct through the diode D$_4$ and the resistor R$_8$ to cut off the supply voltage to CPT 3 as described above and driving of CPT 3 ceases. Again, if a horizontal pulse input of high level is applied to the horizontal pulse input terminal A (during the period t$_4$–t$_5$ in FIG. 2), the transistor TR$_1$ is conducting as described above and the voltage charged to the capacitor C$_1$ is discharged so that the charged voltage of the capacitor C$_1$ becomes lower than that at the connection points P and Q. Consequently, a high level signal is output from the operational amplifier OP$_1$ and a low level signal is output from the operational amplifier OP$_2$. Thereafter the operation is repeated as described above. Accordingly, the CPT 3 is driven while both of the outputs from the operational amplifiers OP$_1$ and OP$_2$ become low to display a color bar on the television screen. In other words, since the output voltage from the automatic fine tuning circuit which is applied to the output terminal B of the automatic fine tuning circuit when a channel is fine-tuned is approximately equal to the voltage at the connection points P and Q, a waveform shown in FIG. 2 (c) is output from the operational amplifier OP$_1$ and a waveform shown in FIG. 2 (d) is output from the operational amplifier OP$_2$ as described above so that a waveform shown in FIG. 2 (e) is output from the connection point R. Therefore, the color bar 5 shown in FIG. 3 (a) is displayed on the television screen 4 while a low level signal is output as shown in FIG. 2 (e) (during the period t$_3$–t$_4$ in FIG. 2). However, in case the output voltage of the automatic fine tuning circuit is lower than the voltage V$_1$ at the connection point P due to inaccurate selection of a channel, the voltage at the connection point P flows through the diode D$_1$ so that the voltage V$_1'$ lower than the voltage V$_1$ is applied to the connection point P.

Therefore, when the charged voltage of the capacitor C$_1$ is higher than the voltage V$_1'$ at the connection point P (at time t$_2$ in FIG. 2), a low level signal is output from the operational amplifier OP$_1$ and at this time the diode D$_2$ is turned off and the voltage at the connection point Q is not charged so that a low level signal is output from the operational amplifier OP$_2$ and then if the charged voltage of the capacitor C$_1$ becomes higher than that of the connection point Q, a high level signal is output from the operational amplifier OP$_2$. In other words, since the duration in which both of the outputs from the operational amplifiers OP$_1$ and OP$_2$ are low level signals (during the period t$_2'$–t$_3$ in FIG. 2) is longer than that of fine tuning, a waveform as shown in FIG. 2 (f) is output from the connection point R so that a color bar widened in the lefthand direction is displayed on the television screen 4 as shown in FIG. 3 (b).

To the contrary, in case the output voltage from the automatic fine tuning circuit applied to the input terminal B is higher than the voltage at the connection point Q due to inaccurate selection of a channel, a voltage V$_2'$ higher than the voltage V$_2$ is applied to the connection point Q since the output voltage from the automatic fine tuning circuit is applied through the diode D$_2$ to the connection point Q. Therefore, when the charged voltage to the capacitor C$_1$ increases and becomes higher than the voltage V$_2'$ at the connection point Q, a high level signal is output from the operational amplifier OP$_2$ so that the duration in which a low level signal is output from both of the operational amplifiers OP$_1$, and OP$_2$ (during the period t$_2$–t$_3'$ in FIG. 2) is longer than that of fine tuning (the period t$_2$–t$_3$) and a waveform as shown in FIG. 2 (g) is output from the connection point R and as a result a color bar 5 widened in the right-hand direction as shown in FIG. 3 (c) is displayed on the television screen 4.

As described hereinbefore, the present invention provides a bar type fine tuning indicating system for a television receiver in which a color bar of a fixed width is displayed in the middle of the television screen when a channel is fine-tuned and the width of the color bar becomes wider in the direction of detuning whereby, whether tuned or not, upon selecting a channel the direction of detuning are readily judged by a subscriber. Also, the present invention has an advantage of curtailing the manufacturing cost due to the simple construction utilizing the operational amplifiers.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:
1. A bar type fine tuning indicating system for a television receiver comprising:
   means for generating a saw tooth wave in a predetermined period by a horizontal blanking pulse signal applied to an input terminal coupled to a negative input terminal of a first operational amplifier and to a positive input terminal of a second operational amplifier;
   a first connection point between first and second resistors, respectively, for reference voltage setting purpose coupled to said positive input terminal of said first operational amplifier; and
   a second connection point between third and fourth resistors, respectively, for reference voltage setting purpose coupled to said negative input terminal of said second operational amplifier,
   said first and second connection points set so as to have voltage values, respectively, slightly less than and greater than output voltage of an AFT circuit being coupled via first and second diodes, respectively, to an output terminal of said AFT circuit so that said voltages of said first and second connection points are varied in accordance with variance of output voltage of said AFT circuit and each of said first and second operational amplifiers having an output terminal connected through third and fourth diodes, respectively, to a CPT driving circuit coupled to a CPT, whereby a color bar is produced in the middle of a television screen when said television receiver is fine tuned and the width of said bar becomes broader in either the right or left direction from the middle of said screen according to the variance of said output voltage of said AFT circuit when said television receiver is detuned.

* * * * *